US012681355B2

(12) United States Patent
Lampron et al.

(10) Patent No.: US 12,681,355 B2
(45) Date of Patent: Jul. 14, 2026

(54) DISPLAY MATERIAL INCLUDING PATTERNED AREAS OF ENCAPSULATED ELECTROPHORETIC MEDIA

(71) Applicant: E Ink Corporation, Billerica, MA (US)

(72) Inventors: Jennifer B. Lampron, Newton, NH (US); Eric J. Duchaine, East Hampstead, NH (US); Peter J. Valianatos, Manchester by the Sea, MA (US)

(73) Assignee: E Ink Corporation, Billerica, MA (US)

( * ) Notice: Subject to any disclaimer, the term of this patent is extended or adjusted under 35 U.S.C. 154(b) by 545 days.

(21) Appl. No.: 18/133,794

(22) Filed: Apr. 12, 2023

(65) Prior Publication Data

US 2023/0333437 A1    Oct. 19, 2023

Related U.S. Application Data

(60) Provisional application No. 63/330,751, filed on Apr. 13, 2022.

(51) Int. Cl.
*G02F 1/167* (2019.01)
*G02F 1/16757* (2019.01)
(Continued)

(52) U.S. Cl.
CPC .......... *G02F 1/167* (2013.01); *G02F 1/16757* (2019.01); *G02F 1/1676* (2019.01); *G02F 1/1679* (2019.01); *G02F 2001/1678* (2013.01)

(58) Field of Classification Search
CPC .. G02F 1/167; G02F 1/16757; G02F 2202/28; G02F 1/1676; G02F 1/1681; G02F 1/133305; G02F 1/16755; G02F 2202/022; G02F 2201/56; G02F 1/155; G02F 2201/123; G02F 1/0018; G02F 1/163; G02F 2202/16; G02F 1/1343; G02B 26/026;
(Continued)

(56) References Cited

U.S. PATENT DOCUMENTS 5,760,761 A    6/1998    Sheridon
5,777,782 A    7/1998    Sheridon
(Continued)

FOREIGN PATENT DOCUMENTS

CN    109613784 A    4/2019
EP    1462847 A1    9/2004
(Continued)

OTHER PUBLICATIONS

Kitamura, T. et al., "Electrical toner movement for electronic paper-like display", Asia Display/IDW '01, pp. 1517-1520, Paper HCS1-1 (2001).
(Continued)

*Primary Examiner* — Brandi N Thomas
(74) *Attorney, Agent, or Firm* — Brian D. Bean

(57) ABSTRACT

Methods for forming patterned displays including separated portions of encapsulated electrophoretic media disposed between contiguous light-transmissive electrodes. The resulting patterned electrophoretic display allows a viewer to see through the gaps between the portions of encapsulated electrophoretic media, thereby allowing the viewer to visualize surfaces or objects behind the electrophoretic display.

12 Claims, 6 Drawing Sheets

(side view)

(51) Int. Cl.
    *G02F 1/1676*     (2019.01)
    *G02F 1/1679*     (2019.01)
    *G02F 1/1675*     (2019.01)

(58) Field of Classification Search
    CPC .... G02B 1/10; G02B 26/005; G02B 23/2407;
                              C08G 18/0866
    See application file for complete search history.

(56) References Cited

U.S. PATENT DOCUMENTS

| | | | |
|---|---|---|---|
| 5,808,783 A | 9/1998 | Crowley | |
| 6,054,071 A | 4/2000 | Mikkelsen, Jr. | |
| 6,055,091 A | 4/2000 | Sheridon et al. | |
| 6,097,531 A | 8/2000 | Sheridon | |
| 6,128,124 A | 10/2000 | Silverman | |
| 6,137,467 A | 10/2000 | Sheridon et al. | |
| 6,147,791 A | 11/2000 | Sheridon | |
| 6,241,921 B1 | 6/2001 | Jacobson et al. | |
| 6,672,921 B1 | 1/2004 | Liang et al. | |
| 6,788,449 B2 | 9/2004 | Liang et al. | |
| 6,922,276 B2 | 7/2005 | Zhang et al. | |
| 6,930,818 B1 | 8/2005 | Liang et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,012,735 B2 | 3/2006 | Honeyman | |
| 7,072,095 B2 | 7/2006 | Liang et al. | |
| 7,075,502 B1 | 7/2006 | Drzaic et al. | |
| 7,075,703 B2 | 7/2006 | O'Neil et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,230,750 B2 | 6/2007 | Whitesides et al. | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,369,299 B2 | 5/2008 | Sakurai et al. | |
| 7,411,719 B2 | 8/2008 | Paolini, Jr. et al. | |
| 7,453,445 B2 | 11/2008 | Amundson | |
| 7,495,819 B2 | 2/2009 | Sakurai et al. | |
| 7,525,719 B2 | 4/2009 | Yakushiji et al. | |
| 7,535,624 B2 | 5/2009 | Amundson et al. | |
| 7,554,712 B2 | 6/2009 | Patry et al. | |
| 7,561,324 B2 | 7/2009 | Duthaler et al. | |
| 7,615,325 B2 | 11/2009 | Liang et al. | |
| 7,646,530 B2 | 1/2010 | Takagi et al. | |
| 7,649,674 B2 | 1/2010 | Danner et al. | |
| 7,679,814 B2 | 3/2010 | Paolini, Jr. et al. | |
| 7,705,823 B2 | 4/2010 | Nihei et al. | |
| 7,715,088 B2 | 5/2010 | Liang et al. | |
| 7,733,554 B2 | 6/2010 | Danner et al. | |
| 7,839,564 B2 | 11/2010 | Whitesides et al. | |
| 8,009,348 B2 | 8/2011 | Zehner et al. | |
| 8,034,209 B2 | 10/2011 | Danner et al. | |
| 8,610,988 B2 | 12/2013 | Zehner et al. | |
| 9,279,906 B2 | 3/2016 | Kang | |
| 9,777,201 B2 | 10/2017 | Widger et al. | |
| 9,835,925 B1 | 12/2017 | Bull et al. | |
| 10,254,617 B2 | 4/2019 | Gauthier et al. | |
| 10,444,553 B2 | 10/2019 | Laxton | |
| 10,983,410 B2 | 4/2021 | Widger et al. | |
| 2006/0087479 A1 | 4/2006 | Sakurai et al. | |
| 2006/0087489 A1 | 4/2006 | Sakurai et al. | |
| 2006/0209008 A1 | 9/2006 | Nihei et al. | |
| 2006/0214906 A1 | 9/2006 | Kobayashi et al. | |
| 2008/0043318 A1 | 2/2008 | Whitesides et al. | |
| 2011/0090143 A1 | 4/2011 | Paek et al. | |
| 2012/0307343 A1 | 12/2012 | Lai et al. | |
| 2014/0247290 A1* | 9/2014 | Miyazaki | G09G 3/344 |
| | | | 345/107 |
| 2015/0005720 A1 | 1/2015 | Zang et al. | |
| 2016/0012710 A1 | 1/2016 | Lu et al. | |
| 2021/0191226 A1 | 6/2021 | Telfer et al. | |

FOREIGN PATENT DOCUMENTS

| | | | |
|---|---|---|---|
| JP | 2004271724 A | 9/2004 | |
| JP | 2011065033 * | 3/2011 | G02F 1/167 |
| JP | 2011065033 A | 3/2011 | |
| WO | 2004079442 A1 | 9/2004 | |

OTHER PUBLICATIONS

Yamaguchi, Y. et al., "Toner display using insulative particles charged triboelectrically", Asia Display/IDW '01, pp. 1729-1730, Paper AMD4-4 (2001).

European Patent Office, "International Search Report and Written Opinion", PCT/US2023/018318, Jun. 15, 2023.

\* cited by examiner

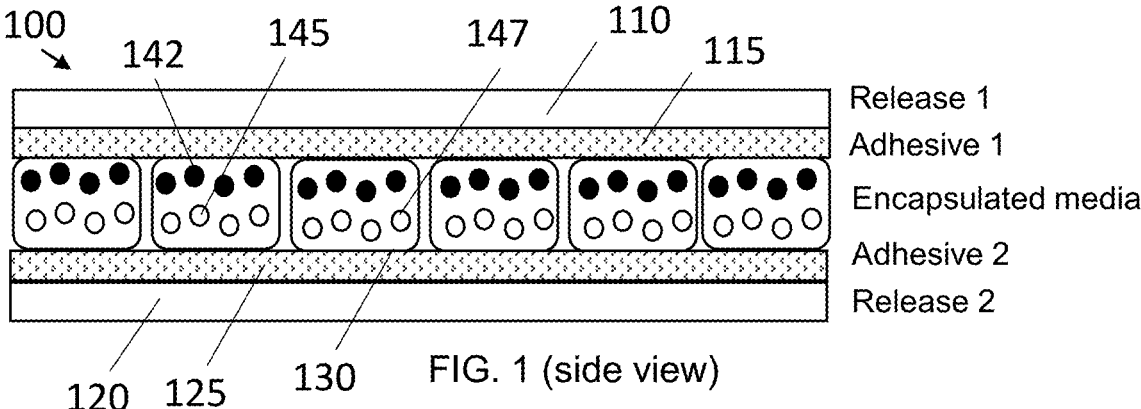
FIG. 1 (side view)
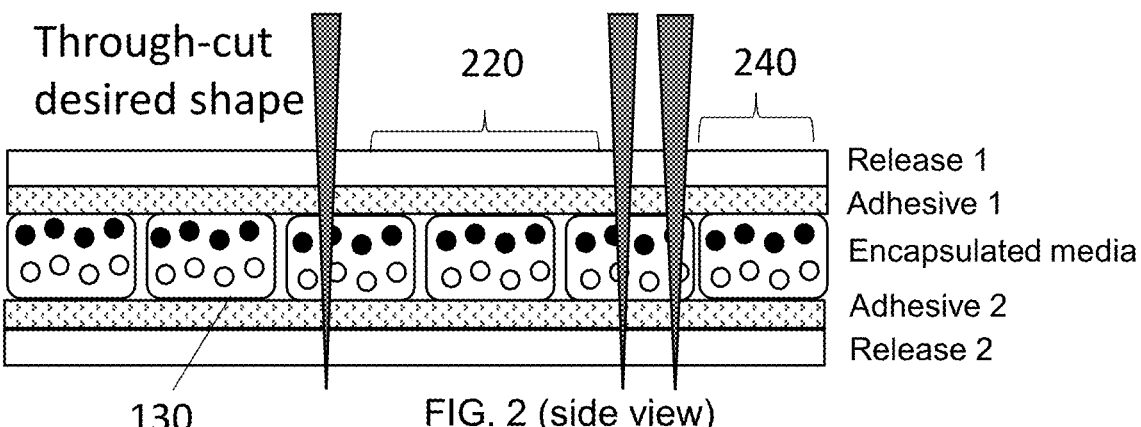
FIG. 2 (side view)
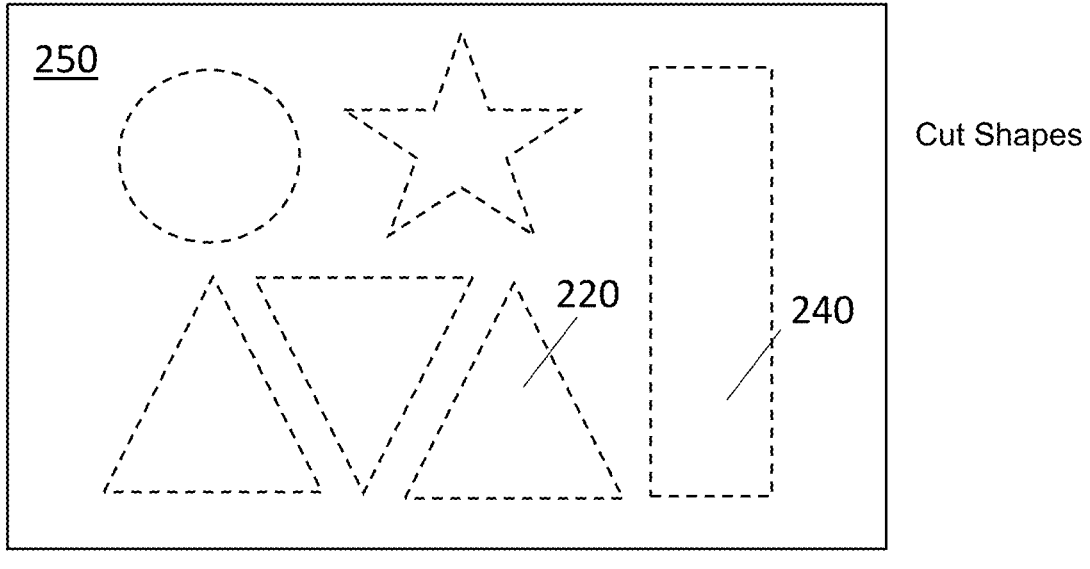
FIG. 3 (top view)

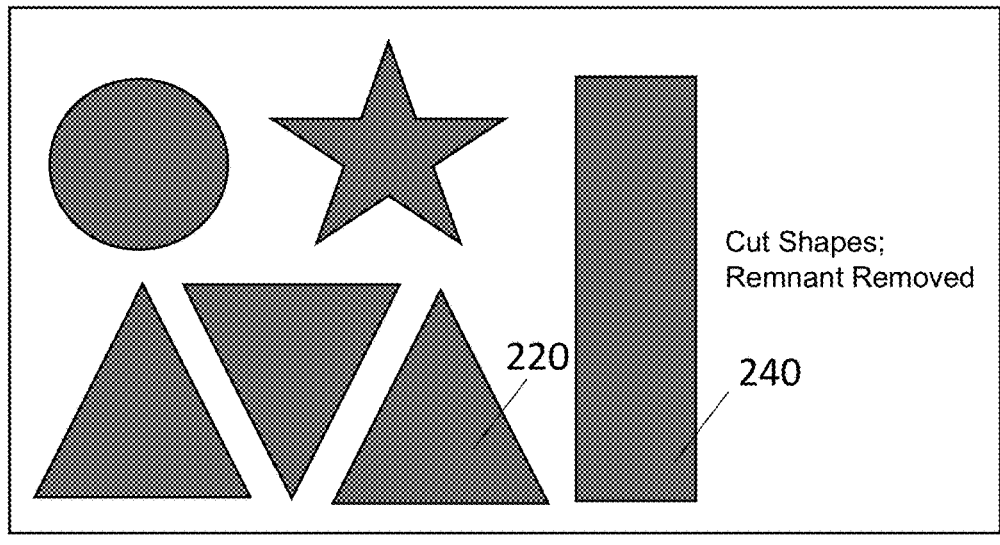
Cut Shapes;
Remnant Removed
220
240
FIG. 4 (top view)
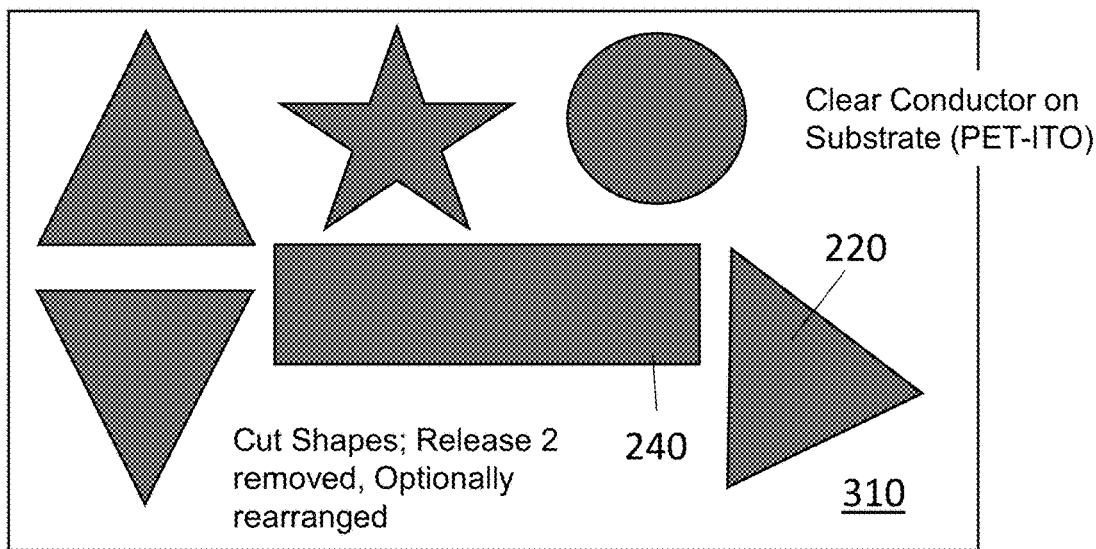
Clear Conductor on
Substrate (PET-ITO)
220
Cut Shapes; Release 2
removed, Optionally
rearranged
240
310
FIG. 5 (top view)
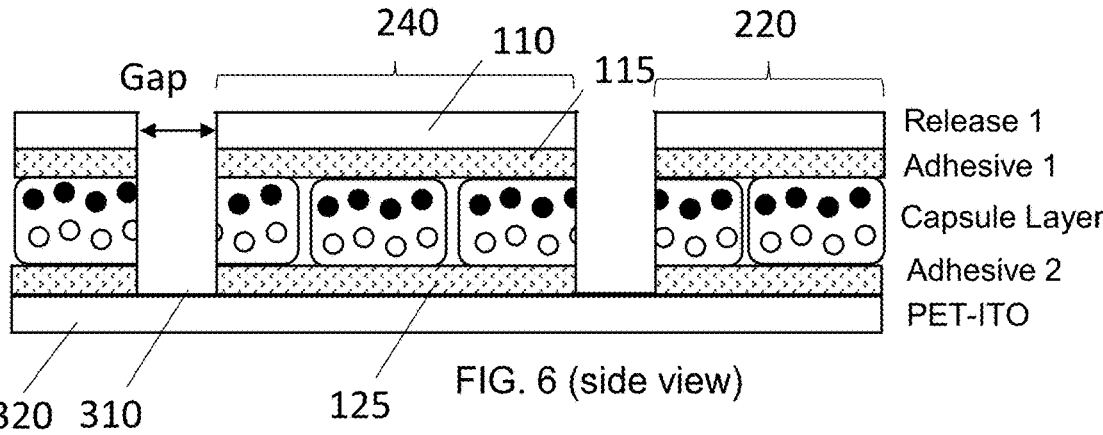
240    110    115    220
Gap
Release 1
Adhesive 1
Capsule Layer
Adhesive 2
PET-ITO
320  310         125
FIG. 6 (side view)

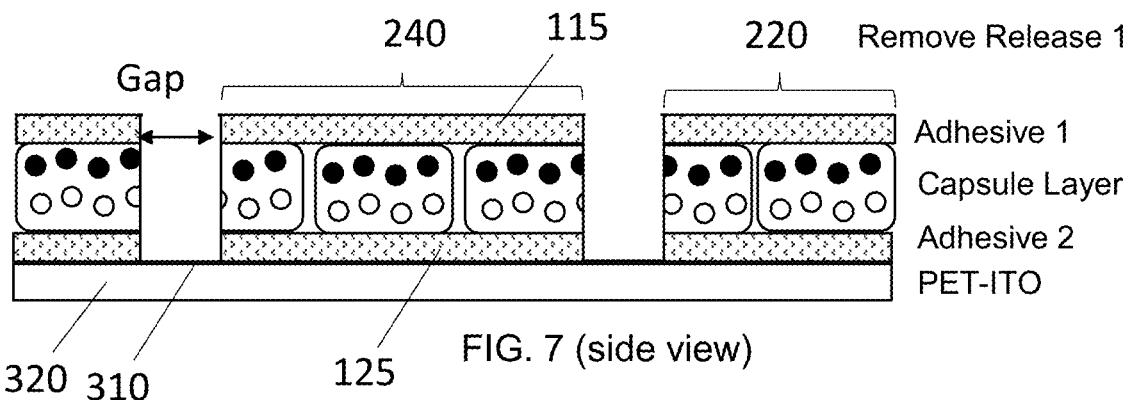
FIG. 7 (side view)
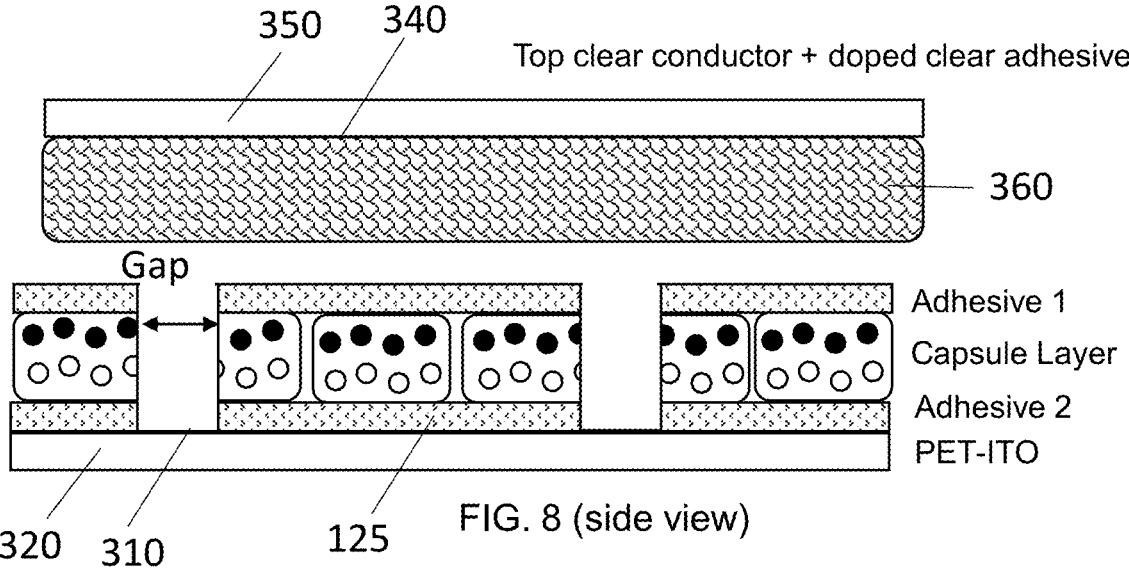
FIG. 8 (side view)
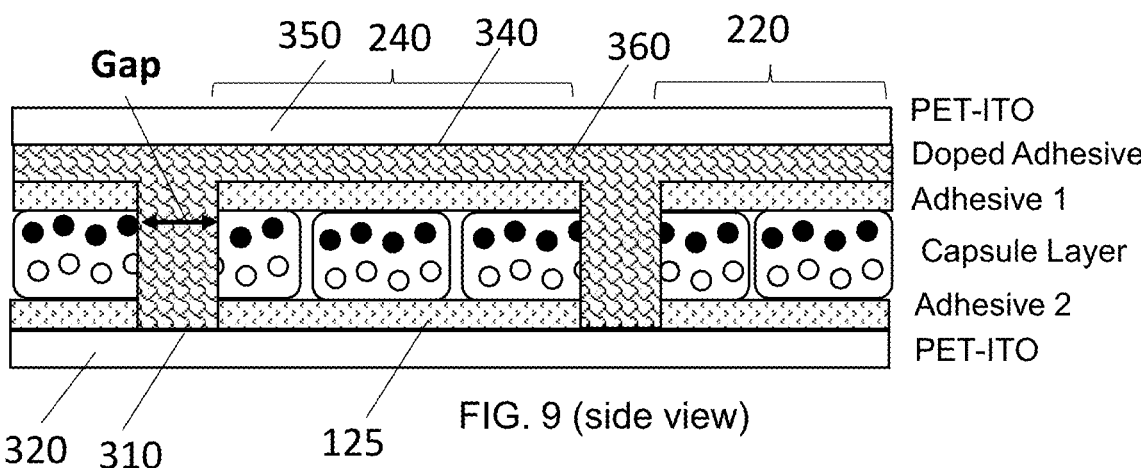
FIG. 9 (side view)

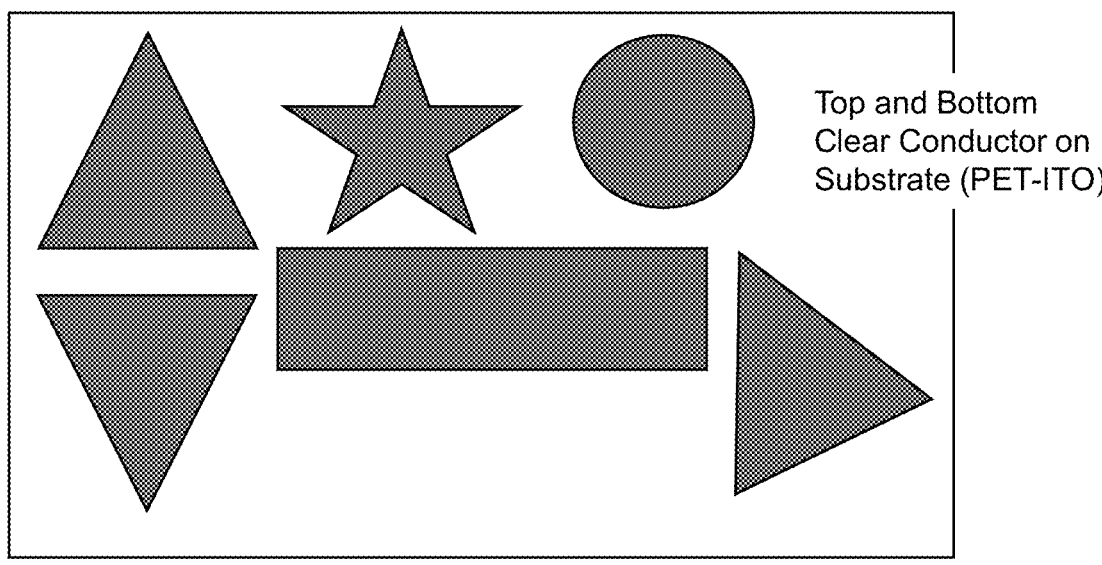
Top and Bottom Clear Conductor on Substrate (PET-ITO)
FIG. 10 (top view)
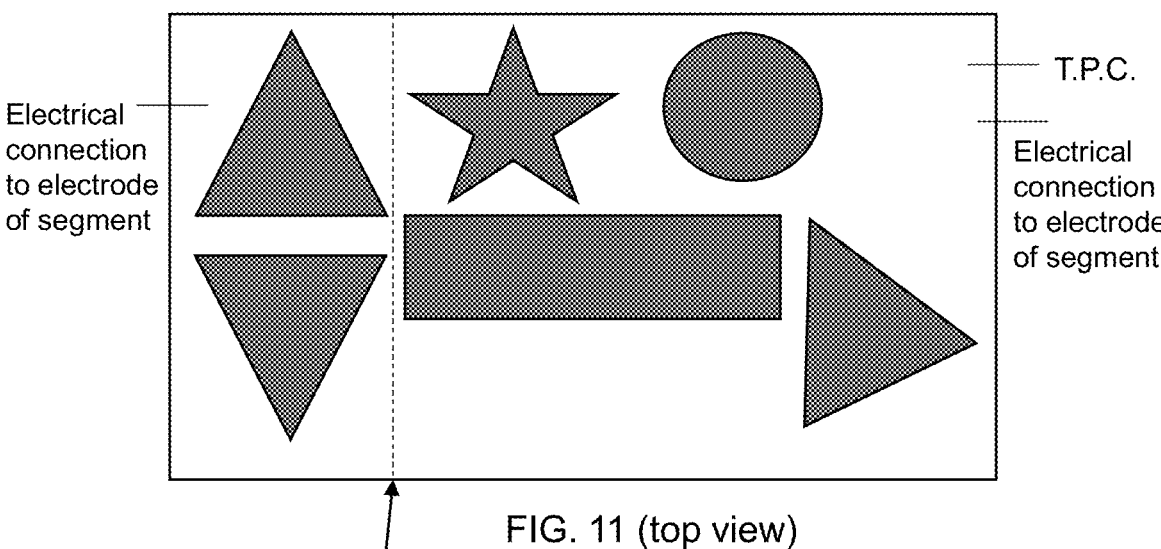
Electrical connection to electrode of segment
T.P.C.
Electrical connection to electrode of segment
FIG. 11 (top view)
Segment one layer of clear conductor to make separate display; do not cut through

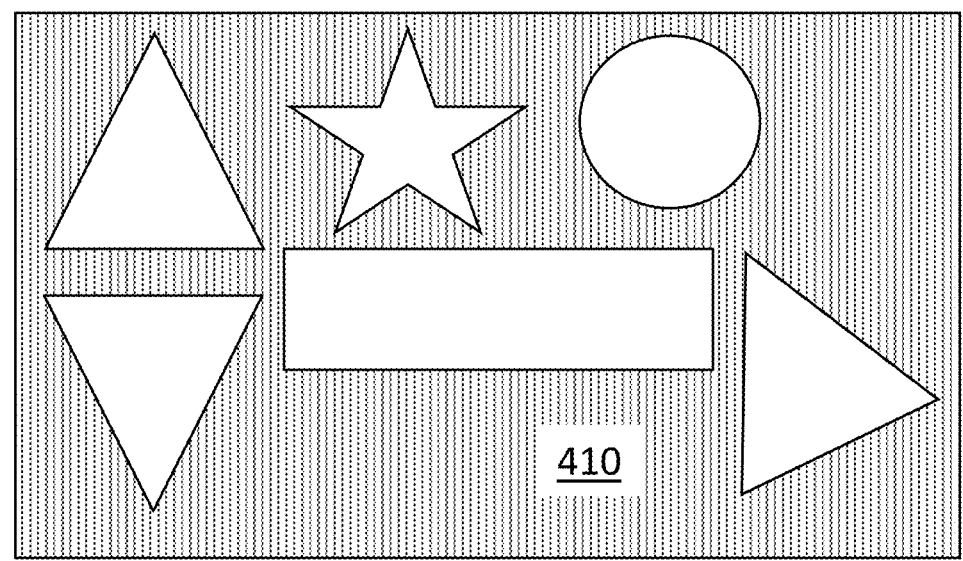
Stencil of desired shapes    FIG. 12 (top view)
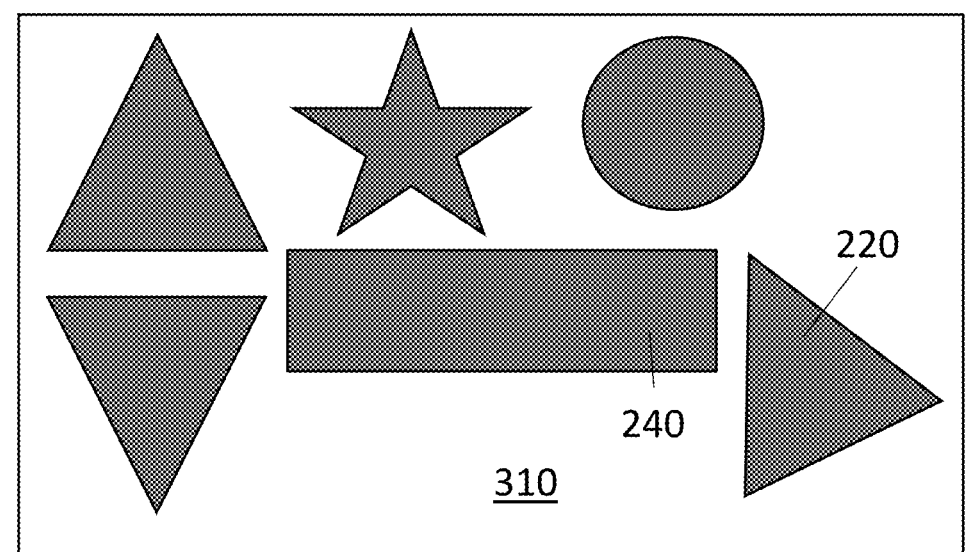
Place stencil on clear conductor on substrate; coat stencil and conductor with adhesive and capsules, remove stencil    FIG. 13 (top view)
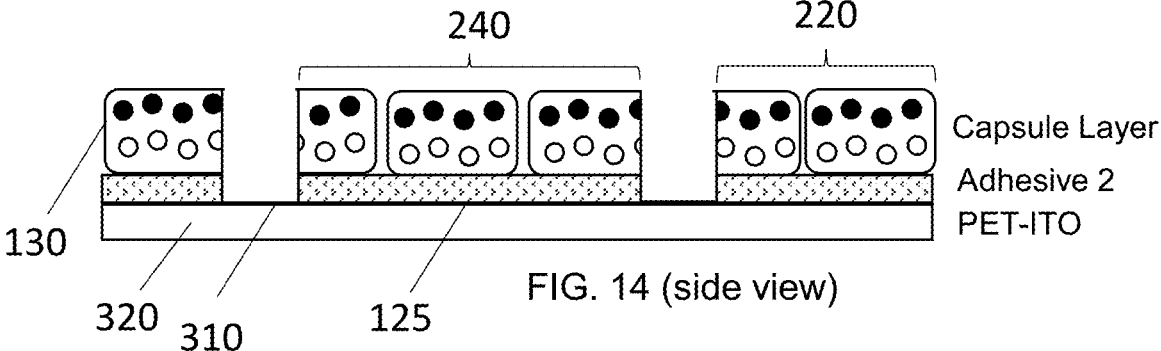
FIG. 14 (side view)

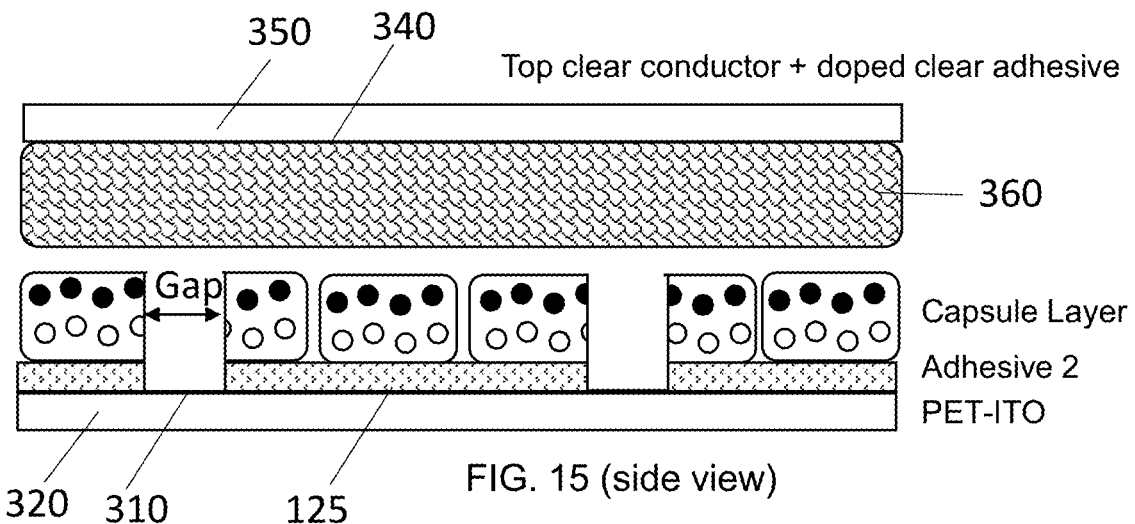
FIG. 15 (side view)
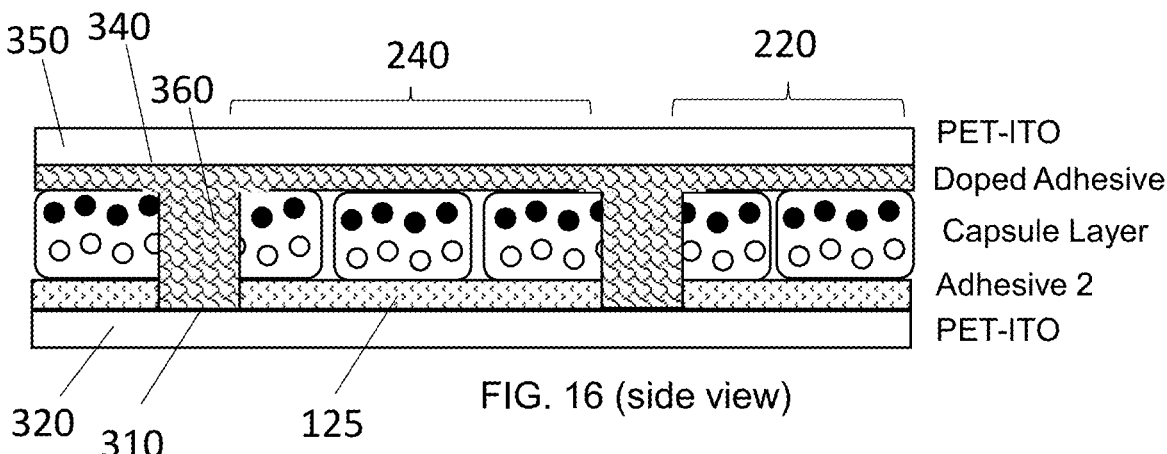
FIG. 16 (side view)
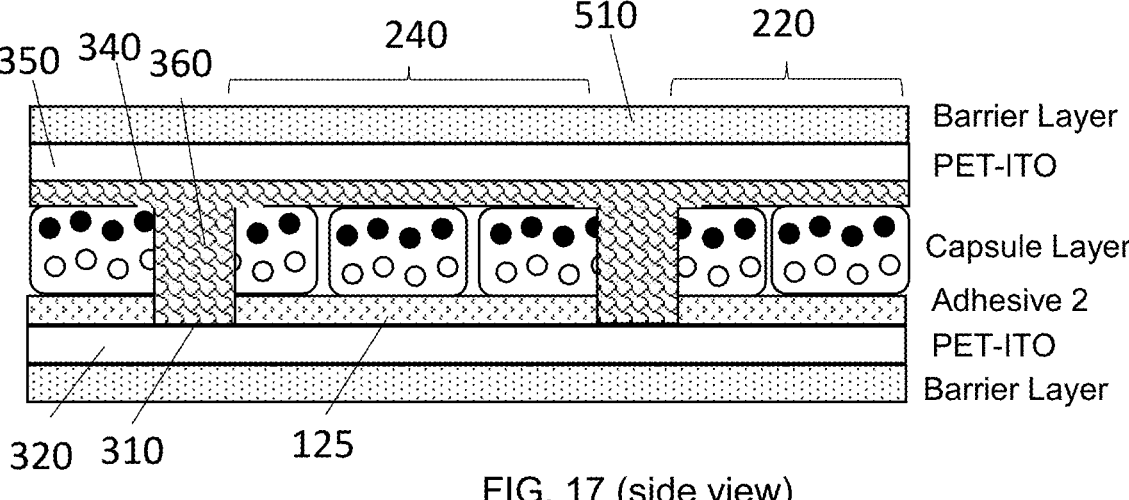
FIG. 17 (side view)

DISPLAY MATERIAL INCLUDING PATTERNED AREAS OF ENCAPSULATED ELECTROPHORETIC MEDIA

RELATED APPLICATIONS

This application claims priority to U.S. Provisional Application No. 63/330,751, filed Apr. 13, 2022. All patents and patent applications disclosed herein are incorporated by reference in their entireties.

FIELD OF THE INVENTION

The invention relates to the field of electrophoretic displays and color-changing materials created using electrophoretic media.

BACKGROUND

Historically, electrophoretic display media in electro-optic displays has been contiguous, sandwiched between controlling electrodes. For example, when the controlling electrodes are also contiguous, the resulting (optionally flexible) sheet materials can be cut to give rise to complicated designs that can be electronically switched between optical states (e.g., E INK PRISM™). Alternatively, the contiguous electrophoretic media may span multiple electrodes, as is the case in active matrix electrophoretic display modules, wherein a contiguous encapsulated layer of electrophoretic media is coated over an active matrix of pixel electrodes. Such assemblies are commonly incorporated into eReaders such as the Amazon KINDLE®. Alternatively, a contiguous encapsulated layer of electrophoretic media may be encapsulated in sealed microcells and laminated to an active matrix backplane as in the E INK SPECTRA™ line of display modules. Previously, it has not been disclosed to intentionally cut portions of electrophoretic media to create segments that are intentionally separated from each other and then formed into a display by placing multiple electrophoretic segments that are not touching each other between the same contiguous top and bottom electrodes.

This invention relates to electro-optic and related devices and to methods for producing such devices. This invention is particularly, but not exclusively, intended for displays comprising electrophoretic media. The term "electro-optic", as applied to a material or a display or a device, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying the sections of the bodies that are seen through a viewing surface. This type of electro-optic medium is typically bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous microcapsules, each of which itself comprises an internal phase containing electrophoretically-mobile particles in a fluid medium, and a capsule wall surrounding the internal phase. Typically, the microcapsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Microcapsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,075,703, 7,116,318, 7,535,624, 7,554,712, 7,561,324, 7,649,674, 7,733,554, 8,034,209, 8,610,988, and 9,835,925;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication No. 2015/0277160; and applications of encapsulation and microcell technology other than displays; see for example U.S. Pat. No. 7,615,325 and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to SiPix Imaging, Inc.

An encapsulated or microcell electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques. Thus, the resulting display can be flexible. Further, because the display medium can be printed (using a variety of methods), the display itself can be made inexpensively.

An electro-optic display normally comprises an electro-optic material layer and at least two other layers disposed on opposed sides of the electro-optic material layer, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic material layer comprises an electrode, the layer on the opposed side of the electro-optic layer typically being a protective layer intended to prevent the movable electrode damaging the electro-optic material layer.

SUMMARY OF THE INVENTION

The invention provides displays including patterned areas of electro-optic material. The electro-optic material is typically encapsulated electrophoretic material, i.e., encapsulated in a capsule, an array of sealed microcells, or electrophoretic media dispersed in a polymer that is not miscible with the electrophoretic media. Alternatively, the encapsulated electro-optic material could include rotating particles, liquid crystals, or electrochromic materials. Regardless, the patterned material can be made to change optical state with the application of an electric field, which is typically created between a top clear electrode and a bottom electrode which may include a single electrode or it may include several (e.g., segmented) electrodes, or it may include an array of pixel electrodes that are individually addressable, e.g., using an array of thin-film transistors (TFT).

Methods of making such displays, using double release laminated electro-optic media as well as stencils are also described.

In a first aspect, an electrophoretic display comprising a first contiguous light-transmissive electrode disposed on a first light-transmissive substrate, a second contiguous light-transmissive electrode disposed on a second light-transmissive substrate, a first portion of encapsulated electrophoretic media disposed between the first contiguous light-transmissive electrode and the second contiguous light-transmissive electrode, and a second portion of encapsulated electrophoretic media disposed between the first contiguous light-transmissive electrode and the second contiguous light-transmissive electrode. In the display, the first portion of encapsulated electrophoretic media does not contact the second portion of encapsulated electrophoretic media and the application of an electric field between the first contiguous light-transmissive electrode and the second contiguous light-transmissive electrode causes a change in optical state of both the first portion of encapsulated electrophoretic media and the second portion of encapsulated electrophoretic media. In some embodiments, the first portion of encapsulated electrophoretic media comprises a first type of electrophoretic particles and the second portion of encapsulated electrophoretic media comprises the first type of electrophoretic particles. In some embodiments, the first portion of encapsulated electrophoretic media comprises a first type of electrophoretic particles and the second portion of encapsulated electrophoretic media comprises a second type of electrophoretic particles and the first and second types of electrophoretic particles have different optical properties. In some embodiments, the first portion of encapsulated electrophoretic media and the second portion of encapsulated electrophoretic media both include more than one type of electrophoretic particle. In some embodiments, the first portion of encapsulated electrophoretic media is encapsulated in microcapsules and the microcapsules are held together with a polymeric binder. In some embodiments, the microcapsules comprise gelatin or polyvinyl alcohol. In some embodiments, the polymeric binder comprises a polyurethane or an acrylate. In some embodiments, the first portion of encapsulated electrophoretic media is encapsulated in microcells and sealed with a polymeric sealing layer. In some embodiments, the microcells comprise an acrylic polymer or a (meth)acrylic polymer. In some embodiments, the display further comprises a light-transmissive semi-conductive adhesive disposed between the first contiguous light-transmissive electrode and the second contiguous light-transmissive electrode. In some embodiments, the light-transmissive semi-conductive adhesive comprises polyurethane doped with an inorganic salt. In some embodiments, the light-transmissive semi-conductive adhesive comprises polyurethane doped with an inorganic salt at a concentration between 2% (wt:wt) and 0.05% (wt:wt). In some embodiments, the light-transmissive semi-conductive adhesive separates the first portion of encapsulated electrophoretic media and the second portion of encapsulated electrophoretic media. In some embodiments, the first portion of encapsulated electrophoretic media and the second portion of encapsulated electrophoretic media are separated by a distance of at least 5 mm, as measured parallel to the first contiguous light-transmissive electrode and the second contiguous light-transmissive electrode.

In another aspect, a method of making an electrophoretic display including providing a layer of encapsulated electrophoretic media disposed between a first release sheet and a first adhesive layer and a second release sheet and a second adhesive layer, patterning the layer of encapsulated electrophoretic media by cutting through the first release sheet the first adhesive layer and the layer of encapsulated electrophoretic media to create a first portion of encapsulated electrophoretic media and a second portion of encapsulated electrophoretic media, disposing the first portion of encapsulated electrophoretic media and the second portion of encapsulated electrophoretic media between a first contiguous light-transmissive electrode disposed on a first light-transmissive substrate and a second contiguous light-transmissive electrode disposed on a second light-transmissive substrate such that the first portion of encapsulated electrophoretic media does not contact the second portion of encapsulated electrophoretic media. In some embodiments, a light-transmissive semi-conductive adhesive is disposed between the first contiguous light-transmissive electrode and the second contiguous light-transmissive electrode, and separates the first portion of encapsulated electrophoretic media from the second portion of encapsulated electrophoretic media. In some embodiments, the first portion of encapsulated electrophoretic media and the second portion of encapsulated electrophoretic media are separated by a distance of at least 5 mm, as measured parallel to the first contiguous light-transmissive electrode and the second contiguous light-transmissive electrode. In some embodiments, patterning comprises cutting through the second release sheet and the second adhesive layer. In some embodiments, patterning is done with a laser, scissors, a knife, or a die. In some embodiments, the patterning step further comprises creating a remnant portion of encapsulated electrophoretic media, and the method further comprises removing the remnant portion of encapsulated electrophoretic media from the layer of encapsulated electrophoretic media.

BRIEF DESCRIPTION OF DRAWINGS

FIG. 1 shows a side view of a double release laminate of encapsulated electrophoretic media.

FIG. 2 illustrates the creation of a patterned shape of encapsulated electrophoretic media by cutting completely through the double release laminate of FIG. 1.

FIG. 3 is a top view showing a variety of shapes that can be cut from a single sheet of double release laminate. In practice, the shapes can be cut very close to each other so that little of the double release laminate is wasted.

FIG. 4 shows the cut shapes after they have been removed from the double release laminate.

FIG. 5 shows the cut shapes affixed to a back conductor, in this case PET-ITO, after one of the two release layers has been removed from the patterned shapes, and the adhesive layer is used to laminate the patterned shape to the back conductor.

FIG. 6 shows a side view of cut shapes affixed to a back conductor, as in FIG. 5.

FIG. 7 shows a side view of FIG. 6 after the second release layer has been removed from the patterned shapes laminated to the back conductor.

FIG. 8 illustrates that a top clear conductor, coated with a doped clear adhesive is laminated to the structure of FIG. 7.

FIG. 9 shows a side view of a completed patterned display including encapsulated electrophoretic medium. Importantly, the doped clear adhesive is not sufficiently conductive to provide an electrical pathway between the top and bottom conductors. The doped clear adhesive results in a smooth surface despite the gaps between the patterned encapsulated electrophoretic media.

FIG. 10 shows a top view of a completed patterned display including encapsulated electrophoretic media. In embodiments where the top and bottom conductors are light-transmissive, e.g., PET-ITO, the intervening space between the patterned encapsulated electrophoretic material is clear. If the electrophoretic media includes, e.g., colored particles, the patterned areas can switch between colors. If the electrophoretic media is of shuttering type, the patterned display including encapsulated electrophoretic media can switch between darkened and light-transmissive.

FIG. 11 shows an alternative embodiment of a patterned display including encapsulated electrophoretic media in which the bottom electrode has been interrupted with a laser cut that only goes through the bottom electrode, thereby creating two independently-addressable segments, each including multiple patterned electro-optic portions. Notably, each bottom electrode requires a separate lead for control, while only a single connection is required for the top electrode, which covers both segments.

FIG. 12 shows an alternative method for creating a patterned display including encapsulated electrophoretic media. In this method a stencil (mask) is cut corresponding to the patterned encapsulated electro-optic media that is desired. The stencil is then laid over the bottom electrode and a slurry of, e.g., capsules including electrophoretic particles in a non-polar fluid can be slot or bar coated over the stencil, and the stencil removed after the coating has been completed.

FIG. 13 is a top view of the back conductor patterned with encapsulated electrophoretic media after the stencil has been removed.

FIG. 14 is a side view of FIG. 13, showing that the alternative method allows for creation of patterned capsules without the need for a second adhesive layer.

FIG. 15 shows adding a top light-transmissive electrode and substrate, such as PET-ITO to the patterned assembly of FIG. 13. The light-transmissive electrode layer is affixed with a doped clear adhesive that retains the relative positions of the patterned electro-optic media as well as the top light-transmissive electrode layer.

FIG. 16 shows a side view of a completed patterned display including encapsulated electrophoretic media using the alternative method of fabrication.

FIG. 17 illustrates the addition of one or more barrier layers that can be used to decrease transport of water vapor into the patterned display including encapsulated electrophoretic media, or reduce damage caused by UV light, or provide mechanical protection, or some combination thereof.

DETAILED DESCRIPTION

The invention describes methods for forming patterned displays including separated portions of encapsulated electrophoretic media, and a resulting patterned display including the portions of encapsulated electrophoretic media. See, e.g., FIG. 5. When the resulting portions of encapsulated electrophoretic media are disposed between two contiguous light-transmissive electrodes, a display is created that allows a viewer to see through portions of the display while receiving information from the encapsulated electrophoretic media portions of the display. See, e.g., FIGS. 9 and 10. Additionally, because areas of the display are transparent (and optionally flexible) when the display is placed against a secondary surface or used to mask an object, the areas of the display that are transparent will take on the look of the surface or object that is behind the display. (To be sure, a "contiguous light-transmissive electrode" span both a first and a second portion of encapsulated electrophoretic media with a gap between the first and second portions. See FIG. 9) In some embodiments, the portions of encapsulated electrophoretic media may transition between light-reflecting and light transmitting (i.e., variable transmission), and in other embodiments, the portions of encapsulated electrophoretic media may transition between light-absorbing and light transmitting. The encapsulated electrophoretic medium may include, one, two, three, four, or more different types of electrophoretic particles.

In one embodiment, the patterned display including encapsulated electrophoretic media is formed from a double release laminate 100 of the type described in U.S. Pat. No. 7,561,324 which is incorporated by reference in its entirety. Such a construction is depicted in FIG. 1, showing a first release sheet 110, a first adhesive layer 115, a second release sheet 120, and a second adhesive layer 125. Between the first release sheet 110 and the first adhesive layer 115, and the second release sheet 120 and the second adhesive layer 125, a layer of encapsulated electrophoretic media 130 is disposed. The layer of encapsulated electrophoretic media 130 maybe of any of the type discussed above, and may comprise a first type of electrophoretic particle 142 and a second type of electrophoretic particle 145 disposed in a non-polar solvent 147. Additionally, it is understood that an electrophoretic medium may include one, two, three, four, five, or six charged particles that move toward or away from the electrodes in the presence of an applied electric field. In some embodiments, the electrophoretic medium is of a shuttering type in that it has a first mode where the pigment is distributed through the container (e.g., a microcapsule or microcell), which creates a darkened state, and a second mode where the pigment is collected in a smaller volume to reduce the amount of transmissive light absorbed, thereby providing a light-transmissive medium. Using the techniques described herein, it is also possible to includes a mixture of patterned electro-optic materials, such as black and white switching media in a first portion of encapsulated electrophoretic media and blue and white switching media in a second portion of encapsulated electrophoretic media. It is also possible to mix different types of electrophoretic media such as a black and white switching patterned portion and a shuttered switching portion. In some embodiments, the patterned capsules or partitioned microcells may be additionally colored, e.g., with ink jet printing before an additional conductive layer is adhered to the capsules. In some embodiments, the different portions of encapsulated electrophoretic media include the same types of electrophoretic particles. In some embodiments, the different portions of encapsulated electrophoretic media include different types of electrophoretic particles.

To create an encapsulated electrophoretic display of the invention, the double release laminate 100 can be patterned to create a first portion of encapsulated electrophoretic media 220 and a second portion of encapsulated electrophoretic media 240, as shown in FIG. 2. The patterning can be done with, for example a laser, scissors, a knife, or a die, represented by narrow wedges in FIG. 2. The patterning may be all the way through the double release laminate 100, as shown in FIG. 2, or the patterning may be only partially through the double release laminate 100, which allows the second release sheet 120 and the second adhesive layer 125 to remain intact. Such precision cutting is best achieved with a laser cutting assembly using a wavelength that is absorbed by a pigment of the electrophoretic medium. Because the pigment is so dense, when the correct laser wavelength is chose, the pigment in the electrophoretic medium layer essentially stops the laser from proceeding beyond the layer of encapsulated electrophoretic media 130. Such a laser cutting system may include, for example a Nd:YAG laser operating at the fundamental wavelength in the near-IR. Such a laser cutting system is available from Trotec Laser, Inc. (Plymouth, Michigan).

As shown in FIG. 3, a variety of portions of encapsulated electrophoretic media can be cut from a single sheet of double release laminate 100. One or more portions of remnant 250 may be removed from the double release laminate 100 to isolate the first portion of encapsulated electrophoretic media 220 and the second portion of encapsulated electrophoretic media 240 (and others, as appropriate) as shown in FIG. 4. When the double release laminate 100 is cut all of the way through both release layers, the resulting portions of encapsulated electrophoretic media are essentially double-sided stickers. In subsequent steps, the second release sheet 120 of each isolated portion can be removed and that portion of encapsulated electrophoretic media can be affixed to, for example, a sheet of PET-ITO using the second adhesive layer 125. The PET-ITO base thus becomes the second contiguous light-transmissive electrode 310 and the second light-transmissive substrate 320 of the claimed display, as shown in FIGS. 5 and 6. According to the invention, the first portion of encapsulated electrophoretic media 220 and the second portion of encapsulated electrophoretic media 240 do not contact, because they are separated by a gap, i.e., as shown in FIG. 6. The gap between the first portion of encapsulated electrophoretic media 220 and the second portion of encapsulated electrophoretic media 240 is typically at least 5 mm, as measured parallel to the first contiguous light-transmissive electrode and the second contiguous light-transmissive electrode. In some instances, the gap is larger, e.g., at least 1 cm, e.g., at least 5 cm, e.g., between 1 cm and 10 cm.

After the first portion of encapsulated electrophoretic media 220 and the second portion of encapsulated electrophoretic media 240 have been located on the second contiguous light-transmissive electrode 310, the first release sheet 110 can then be removed from all of the portions of encapsulated electrophoretic media, as shown in FIG. 7. The first contiguous light-transmissive electrode 340 and the first light-transmissive substrate 350 (e.g., a second sheet of PET-ITO) are coated with a light-transmissive semi-conductive adhesive 360 and the assembly of the first contiguous light-transmissive electrode 340, the first light-transmissive substrate 350, and the light-transmissive semi-conductive adhesive 360 are applied to the collection of the first portion of encapsulated electrophoretic media 220, the second portion of encapsulated electrophoretic media 240, the second contiguous light-transmissive electrode 310, and the second light-transmissive substrate 320 as shown in FIG. 8. The resulting electrophoretic display is shown in a side profile in FIG. 9, and from above in FIG. 10.

The light-transmissive semi-conductive adhesive 360 can be made from a number of different light-transmissive adhesives such as acrylics and polyurethanes, however polyurethanes are typically preferred. It is important that the light-transmissive semi-conductive adhesive 360 is sufficiently conductive that it does not create a dielectric layer between the first contiguous light-transmissive electrode 340 and the layers of electrophoretic media, however it must not be conductive enough to create a shorting pathway between the first contiguous light-transmissive electrode 340 and the second contiguous light-transmissive electrode 310, especially in the gap between the first portion of encapsulated electrophoretic media 220 and the second portion of encapsulated electrophoretic media 240. Accordingly, the light-transmissive semi-conductive adhesive 360 is typically doped with a salt or charged polymers. The salt may be, for example, an inorganic salt, an organic salt, or a combination thereof. In one embodiment, the salt comprises potassium acetate. In an alternative embodiment, the salt may comprise a quaternary ammonium salt, for example a tetraalkylammonium salt, such as tetrabutylammonium chloride or hexafluorophosphate. Suitable light-transmissive semi-conductive adhesive 360 are available from Merck KGaA. The volume resistivity of the light-transmissive semi-conductive adhesive 360 is typically between $1 \times 10^5$ and $1 \times 10^{12}$ Ohm cm.

The invention is not limited to the embodiment shown in FIGS. 9 and 10. There are several variations that are useful, and alternate methods can be used to fabricate such displays, as described below. In one embodiment, the final assembly of the first portion of encapsulated electrophoretic media 220 and the second portion of encapsulated electrophoretic media 240 disposed between the first contiguous light-transmissive electrode 340 and the second contiguous light-transmissive electrode 310 can be made to switch optical states separately, as shown in FIG. 11. Using a different type of laser, or a knife, it is possible to cut through only one of the two contiguous light-transmissive electrodes, thereby dividing the display into zones that can be separately controlled with different power connections. With this method, an assembly comprising, for example, eight different zones of switching, each with multiple portions of encapsulated electrophoretic media can be created.

Alternate methods of fabricating a display of the invention include using a mask, template, or stencil 410 as shown in FIG. 12. In this embodiment, the starting substrate is the second contiguous light-transmissive electrode 310 on the second light-transmissive substrate 320, however the stencil 410 is placed atop the light-transmissive electrode 310 and a layer of encapsulated electrophoretic media 130 is applied over the entire stencil, e.g., using a bar coating method or spray coating the electrophoretic media. Once the stencil is removed, the first portion of encapsulated electrophoretic media 220 and the second portion of encapsulated electrophoretic media 240 remain on the second contiguous light-transmissive electrode 310 on the second light-transmissive substrate 320, very similar to the structure shown in FIG. 5, however the structure of FIG. 13 is missing the first release sheet 110 and the first adhesive layer 115. Compare FIGS. 5 and 6 to FIGS. 13 and 14. It is noted that this alternative method of creating the electrophoretic display only works with encapsulated electrophoretic media that are encapsulated in microcapsules which can be coated over the stencil as a slurry or sprayed with a spray gun (see U.S. Pat. No. 9,835,925, which is incorporated by reference in its entirety). Similar to the first method, the alternative method is completed with the addition of the first contiguous light-transmissive electrode 340 and the first light-transmissive substrate 350 that have been coated with a light-transmissive semi-conductive adhesive 360 the first portion of encapsulated electrophoretic media 220, the second portion of encapsulated electrophoretic media 240, the second contiguous light-transmissive electrode 310, and the second light-transmissive substrate 320. Compare FIG. 8 and FIG. 15. The final structure, FIG. 14 is very similar to the final structure using the first method, however the first adhesive layer 115 is missing from FIG. 16. Compare FIG. 9 and FIG. 16. In some instances, removing a layer of adhesive is optically-beneficial because every layer of differential materials presents a new scattering interface. In particular, the design of FIG. 16 may have lower haze and better transmission when the electrophoretic media is of the shuttering type.

The electrophoretic material layer of the present invention may comprises an electrophoretic medium. The electrophoretic medium may be compartmentalized in microcapsules or in microcell. The electrophoretic material layers has an upper surface, a lower surface, and a peripheral surface. The upper surface and the lower surface are on opposite sides of the electrophoretic material layer. The upper surface of the electrophoretic material layer is defined by a perimeter. The perimeter has a length and a width.

The electro-optic device of the present invention may comprise a first adhesive layer and/or a second adhesive layer. The first adhesive layer has an upper surface, a lower surface, and a peripheral surface. The adhesives can be made from a variety of materials, such as acrylics and polyurethanes, however polyurethanes are typically preferred. The upper surface and the lower surface are on opposite sides of the first adhesive layer. The term "length and width of the first adhesive layer" refers to the length width dimensions of the upper surface of the first adhesive layer. The second adhesive layer has an upper surface, a lower surface, and a peripheral surface. The upper surface and the lower surface are on opposite sides of the second adhesive layer. The term "length and width of the second adhesive layer" refers to the length and width dimensions of the upper surface of the second adhesive layer.

The electro-optic device of the present invention comprises a backplane, which may be used interchangeable with a second electrode layer. The backplane has an upper surface, a lower surface, and a peripheral surface. The upper surface and the lower surface are on opposite sides of the backplane. The term "length and width of the backplane" refers to the length and width of the upper surface of the backplane.

The term "active display area" is the area of the viewing surface of the electrophoretic display where a variable image can be displayed. Variable image of an electrophoretic display is an image that can be created as a result of the application of electric field on an electrophoretic material layer of the electrophoretic display.

In some embodiments, the electro-optic material is an electrophoretic medium compartmentalized in microcapsules. Alternatively, the electrophoretic medium may be compartmentalized in microcells. The electrophoretic medium may comprise electrophoretic particles in a nonpolar liquid.

For example, in several of the aforementioned E Ink patents and applications a process for manufacturing of an encapsulated electrophoretic display is described, wherein an encapsulated electrophoretic medium comprising microcapsules in a binder is coated onto a flexible substrate comprising indium-in-oxide (ITO) or similar conductive coating or an adhesive coupled to a release sheet, i.e., as described above. In some embodiments, the conductive coating is the first light-transmissive electrode layer. Drying or curing the microcapsules/binder coating forms the electro-optic material layer, which is firmly adhered to the first light-transmissive layer. Microcapsules suitable for use with the invention may include gelatin-acacia microcapsules as described in U.S. Pat. Nos. 7,230,750 and 10,983,410, both of which are incorporated by reference in their entireties. Alternative microcapsule materials include non-ionic polymers, such as polyvinyl alcohol, as described in U.S. Patent Publication No. 2021/0191226, which is incorporated by reference in its entirety. The binder is typically cured with heat or UV light, and may be cross-linked as needed for the application. Binders suitable for use with encapsulated electrophoretic media include polyurethanes, such as sold by Merck KGaA, and acrylics such as sold by Sartomer (a division of Arkema). More examples of suitable binders can be found in U.S. Pat. No. 9,777,201, which is incorporated by reference in its entirety.

In alternative embodiments, the encapsulated electrophoretic media is encapsulated in a plurality of microcells. The microcells may be square, round, or polygonal, such as a honeycomb structure. The microcells are typically fabricated by microembossing sheets of acrylic or methacrylic sheet materials, as described in U.S. Pat. No. 6,930,818, which is incorporated by reference in its entirety. Each microcell includes an opening that is spanned by a polymeric sealing layer. The polymeric sealing layer may be constructed from a variety of materials, such acrylate, methacrylate, polycarbonate, polyvinyl alcohol, cellulose, poly (N-isopropylacrylamide) (PNIPAAm), poly(lactic-co-glycolic acid) (PLGA), polyethylene, polypropylene, or polystyrene. The encapsulated electrophoretic media in microcells may be prepared as a double release laminate, or the microcells can be coupled to a light-transmissive electrode layer on a light-transmissive substrate, such as PET-ITO.

The light-transmissive top (or bottom) conductive layer (electrode) may be carried on a light-transmissive substrate, which is preferably flexible, in the sense that the substrate can be manually wrapped around a drum, say, 25 mm in diameter without permanent deformation. The substrate will be typically a polymeric film, and will normally have a thickness in the range of about 1 to about 25 mil (25 to 634 μm), preferably about 2 to about 10 mil (51 to 254 μm). The light-transmissive electrode is conveniently a thin metal layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate. A light-transmissive substrate need not be flexible, however. A light-transmissive substrate may be, for example, glass or a clear rigid polymer, such as cross-linked acrylic or another rigid light-transmissive polymer.

Assembly of an electro-optic device using such a front plane laminate may be affected by removing the release sheet from the front plane laminate and contacting the first adhesive layer with the backplane under conditions effective to cause the first adhesive layer to adhere to the backplane, thereby securing the first adhesive layer, electrophoretic medium and electrically-conductive layer to the backplane. This process is well-adapted to mass production since the front plane laminate may be mass produced, typically using roll-to-roll coating techniques, and then cut into pieces of any size needed for use with specific backplanes. Then, an edge seal compositions is dispensed around the piece to create the conductive edge seal after drying or curing of the edge seal composition. The device is typically exposed to a moisture conditioning step at certain temperature and relative humidity before edge sealing.

A patterned display including encapsulated electrophoretic media may additionally include an edge seal. The edge seal composition may comprise a polymer or combination of polymers. Drying or curing of the edge seal composition forms the edge seal of the device. Non-limiting examples of polymers are polyurethane, epoxy, polydimethylsiloxane, polyacrylate, polymethacrylate, polycarbonate, polyvinyl chloride, polystyrene-alkylene copolymer, polyamide, polyester, polystyrene, polyethylene, polypropylene, polyisobutylene, poly(ethylene terephthalate), poly(ethylene naphthalate), ethylene-vinyl alcohol copolymer, poly(ethylene-co-norbornene), styrene-isobutylene-styrene block copolymer and mixtures thereof. The edge seal composition may comprise conductive fillers such as metal particles, metal nanoparticles, metal wires, metal nanowires, metal nanofibers, conductive carbon black particles, carbon nanotubes, graphite, and combinations thereof. The edge seal composition may also comprise conductive polymers. Non-limiting examples of conductive polymers are poly(3,4-ethylenedioxythiophene) polystyrene sulfonate (PEDOT-PSS), polyacetylene, polyphenylene sulfide, polyphenylene vinylene, and combinations thereof. A display of the invention may additionally include a barrier layer 510, as shown in FIG. 17, which is typically a light-transmissive sheet that is impervious to water (i.e., has a very low WVTR). The barrier layer may also protect against physical damage due to, e.g., contact with a sharp object. Suitable barrier materials include polyethylenes, polyimides, glass, and vapor deposited ceramics, such as indium tin oxide and silicon nitride. An additional layer of optically-clear adhesive (OCA) may be used to adhere the barrier layer 510 to the first light-transmissive substrate 350.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic display comprising:
a first contiguous light-transmissive electrode disposed on a first light-transmissive substrate;
a second contiguous light-transmissive electrode disposed on a second light-transmissive substrate;
a first portion of encapsulated electrophoretic media disposed between the first contiguous light-transmissive electrode and the second contiguous light-transmissive electrode;
a second portion of encapsulated electrophoretic media disposed between the first contiguous light-transmissive electrode and the second contiguous light-transmissive electrode; and
a light-transmissive semi-conductive adhesive disposed between the first contiguous light-transmissive electrode and the second contiguous light-transmissive electrode, wherein the first portion of encapsulated electrophoretic media does not contact the second portion of encapsulated electrophoretic media,
wherein the light-transmissive semi-conductive adhesive separates the first portion of encapsulated electrophoretic media and the second portion of encapsulated electrophoretic media, and
wherein application of an electric field between the first contiguous light-transmissive electrode and the second contiguous light-transmissive electrode causes a change in optical state of both the first portion of encapsulated electrophoretic media and the second portion of encapsulated electrophoretic media.

2. The electrophoretic display of claim 1, wherein the first portion of encapsulated electrophoretic media comprises a first type of electrophoretic particles and the second portion of encapsulated electrophoretic media comprises the first type of electrophoretic particles.

3. The electrophoretic display of claim 1, wherein the first portion of encapsulated electrophoretic media comprises a first type of electrophoretic particles and the second portion of encapsulated electrophoretic media comprises a second type of electrophoretic particles, and the first and second types of electrophoretic particles have different optical properties.

4. The electrophoretic display of claim 1, wherein the first portion of encapsulated electrophoretic media and the second portion of encapsulated electrophoretic media both include more than one type of electrophoretic particle.

5. The electrophoretic display of claim 1, wherein the first portion of encapsulated electrophoretic media is encapsulated in microcapsules and the microcapsules are held together with a polymeric binder.

6. The electrophoretic display of claim 5, wherein the microcapsules comprise gelatin or polyvinyl alcohol.

7. The electrophoretic display of claim 6, wherein the polymeric binder comprises a polyurethane or an acrylate.

8. The electrophoretic display of claim 1, wherein the first portion of encapsulated electrophoretic media is encapsulated in microcells and sealed with a polymeric sealing layer.

9. The electrophoretic display of claim 8, wherein the microcells comprise an acrylic polymer or a (meth)acrylic polymer.

10. The electrophoretic display of claim 1, wherein the light-transmissive semi-conductive adhesive comprises polyurethane doped with an inorganic salt.

11. The electrophoretic display of claim 10, wherein the light-transmissive semi-conductive adhesive comprises polyurethane doped with an inorganic salt at a concentration between 2% (wt:wt) and 0.05% (wt:wt).

12. The electrophoretic display of claim 1, wherein the first portion of encapsulated electrophoretic media and the second portion of encapsulated electrophoretic media are separated by a distance of at least 5 mm, as measured parallel to the first contiguous light-transmissive electrode and the second contiguous light-transmissive electrode.

* * * * *